United States Patent
Jang et al.

(10) Patent No.: US 6,965,909 B2
(45) Date of Patent: Nov. 15, 2005

(54) TIME-DIVISION TYPE MATRIX CALCULATOR

(75) Inventors: Geun-sik Jang, Suwon (KR); Bong-soon Kang, Busan (KR)

(73) Assignee: Samsung Electronics Co., Ltd., Kyungki-do (KR)

( * ) Notice: Subject to any disclaimer, the term of this patent is extended or adjusted under 35 U.S.C. 154(b) by 623 days.

(21) Appl. No.: 10/060,232

(22) Filed: Feb. 1, 2002

(65) Prior Publication Data

US 2002/0138536 A1 Sep. 26, 2002

(30) Foreign Application Priority Data

Feb. 5, 2001 (KR) ............................................ 2001-5334

(51) Int. Cl.[7] .............................................. G06F 17/16
(52) U.S. Cl. ....................................................... 708/607
(58) Field of Search ........................................ 708/607

(56) References Cited

U.S. PATENT DOCUMENTS

| | | | |
|---|---|---|---|
| 5,021,987 A | | 6/1991 | Chan et al. |
| 5,206,822 A | * | 4/1993 | Taylor ........................ 708/607 |
| 5,299,146 A | | 3/1994 | Kanoh |
| 5,311,459 A | * | 5/1994 | D'Luna et al. ............. 708/607 |
| 5,867,414 A | * | 2/1999 | Kao .......................... 708/607 |

* cited by examiner

Primary Examiner—D. H. Malzahn
(74) Attorney, Agent, or Firm—Sughrue Mion, PLLC

(57) ABSTRACT

A matrix calculator calculates multiplication of two matrices. The matrix calculator includes an element selecting portion for selecting elements from elements of the two matrices that would constitute sub-elements of each element of a multiplication result matrix and sequentially outputs the selected element, a calculating portion for adding products of output from the element selecting portion and sequentially outputs the elements of the result matrix, and a control signal generating portion for generating a control signal that controls a timing of operation of the calculating portion and the storing portion. Since the respective elements of the two matrices are sequentially selected to be multiplied and added, the elements of the multiplication result matrix, which are the sums of the sub-elements, can be calculated sequentially. Accordingly, since the matrix calculator can be constructed of one adder and one multiplier and a control circuit, the size of the circuit is reduced.

4 Claims, 5 Drawing Sheets

TIME-DIVISION TYPE MATRIX CALCULATOR

BACKGROUND OF THE INVENTION

1. Field of the Invention

The present invention relates to a time-division type matrix calculator, and more particularly, to a matrix calculator for multiplying two matrices by sequentially selecting elements of the matrices and performing multiplication and addition of the selected elements. The present invention is based on Korean Patent Application No. 2001-5334 filed on Feb. 5, 2001, which is incorporated herein by reference.

2. Description of the Related Art

Generally, in a field such as image signal processing, multiplication of matrices is often required. In order to perform the multiplication of the matrices, a matrix calculator uses a plurality of multipliers and a plurality of adders to obtain a mathematical expression of a result of a multiplication operation.

FIG. 1 is a block diagram of a conventional matrix calculator, especially showing a matrix calculator that performs multiplication with two 3×3 square matrices. FIG. 2 shows detailed construction of each block of FIG. 1.

When the first matrix is X matrix, and the second matrix is Y matrix, the X matrix is, $$\begin{bmatrix} X1 & X2 & X3 \\ X4 & X5 & X6 \\ X7 & X8 & X9 \end{bmatrix},$$

and Y matrix is, $$\begin{bmatrix} Y1 & Y2 & Y3 \\ Y4 & Y5 & Y6 \\ Y7 & Y8 & Y9 \end{bmatrix}.$$

Also, a product of X and Y matrices is, $$\begin{bmatrix} Z1 & Z2 & Z3 \\ Z4 & Z5 & Z6 \\ Z7 & Z8 & Z9 \end{bmatrix} = \begin{bmatrix} X1 & X2 & X3 \\ X4 & X5 & X6 \\ X7 & X8 & X9 \end{bmatrix} \begin{bmatrix} Y1 & Y2 & Y3 \\ Y4 & Y5 & Y6 \\ Y7 & Y8 & Y9 \end{bmatrix} = \begin{bmatrix} X1Y1+X2Y4+X3Y7 & X1Y2+X2Y5+X3Y8 & X1Y3+X2Y6+X3Y9 \\ X4Y1+X5Y4+X6Y7 & X4Y2+X5Y5+X6Y9 & X4Y3+X5Y6+X6Y9 \\ X7Y1+X8Y4+X9Y7 & X7Y2+X8Y5+X9Y8 & X7Y3+X8Y6+X9Y9 \end{bmatrix}$$

As shown in FIG. 1, the conventional matrix calculator for processing the operation as described above includes three blocks 10, 20, and 30. The first block 10 is input with X1, X2, X3, the second block 20 is input with X4, X5, X6, and the third block 30 is input with X7, X8, X9. Further, each of the blocks 10, 20, 30 is input with Y1 through Y9.

As shown in FIG. 2, the first block 10 includes nine (9) multipliers 11 input with Y1 through Y9, respectively, nine (9) D flip-flops 13 (three (3) groups of three (3) D flip-flops—an upper three flip-flops, an intermediate three flip-flops, and a lower three flip-flops) for storing output from the multipliers 11, and three (3) adders 15 input with outputs from three of the nine (9) D flip-flops 13, respectively. The upper three multipliers 11 are input with X1, the intermediate three multipliers 11 are input with X2, and the lower three multipliers 11 are input with X3. Outputs from the respective multipliers 11 are stored in the D flip-flops 13 and then input into the adders 15. The adders 15 add input values and output the results Z1, Z2, Z3, respectively.

Constructions of the second and the third blocks 20 and 30 are identical to the construction of the first block 10 shown in FIG. 2. That is, the second block 20 outputs Z4, Z5, Z6, and the third block 30 outputs Z7, Z8, Z9.

The conventional matrix calculator, however, has a disadvantage in that the circuit becomes bulky since it requires a plurality of multipliers 11 and adders 15. That is, a total of twenty-seven (27) multipliers 11 are required for the block 10, 20, 30, while eighteen (18) adders 15 are required for the blocks 10, 20, 30 (since the adder 15 adds three inputs, each adder 15 actually consists of two adders, each of which adds two inputs).

SUMMARY OF THE INVENTION

The present invention has been made to overcome the above-mentioned problems of the related art, and accordingly, it is an object of the present invention to provide a matrix calculator capable of reducing the number of adders and the size of a circuit by sequentially calculating elements of a multiplication result matrix.

The above-stated object is accomplished by a matrix calculator for performing multiplication on a first matrix and a second matrix in accordance with the present invention, including an element selecting portion being input with elements of the first and the second matrices, the element selecting portion for sequentially selecting each of the input elements that will constitute a multiplicand of each sub-element of each element of a multiplication result matrix, and for sequentially outputting the selected element, a calculating portion for sequentially calculating each element of the multiplication result matrix by sequentially adding multiplied values of outputs from the element selecting portion, a storing portion for storing output from the calculating portion, and a control signal generating portion for generating a control signal that controls a timing of operation of the calculating portion and the storing portion.

The element selecting portion includes a multiplexer being input with the respective elements of the first and the second matrices in parallel, and a control block for generating a selection signal that selects an output from the multiplexer. The calculating portion includes a multiplier for multiplying the output from the multiplexer, a first memory for temporarily storing output from the multiplier, a second memory, and an adder for adding a value stored in the first memory with a value stored in the second memory, and inputting the resultant value of the adding operation into the second memory.

The control signal generating portion includes a plurality of flip-flops for generating signals that delay signals output from the control block by a predetermined number of clock pulses, respectively, and then inputs the generated signals into the calculating portion and the storing portion. The storing portion includes a plurality of registers for sequentially storing the output from the calculating portion.

According to the present invention, the elements consisting of the sums of sub-elements of the multiplication result matrix are sequentially calculated, by sequentially selecting, multiplying and adding the elements of the two multiplicand matrices. Accordingly, the matrix calculator can be constructed with one adder, one multiplier, and a control circuit for controlling the adder and the multiplier, so the size of the circuit is reduced.

BRIEF DESCRIPTION OF THE DRAWINGS

The above-mentioned objects and the feature of the present invention will be more apparent by describing the preferred embodiment of the present invention in detail referring to the appended drawings, in which.

DETAILED DESCRIPTION OF PREFERRED EMBODIMENT

Detailed description according to the preferred embodiment of the present invention will follow referring to the attached drawings.

First, in order to explain the principle of calculation of a matrix calculator in accordance with the present invention, a method for analyzing the result matrix of the matrix multiplication into respective elements will be described below.

As described above, Z matrix, which is the result matrix of the multiplication of the X matrix and the Y matrix is, $$\begin{bmatrix} Z1 & Z2 & Z3 \\ Z4 & Z5 & Z6 \\ Z7 & Z8 & Z9 \end{bmatrix} =$$

$$\begin{bmatrix} X1 & X2 & X3 \\ X4 & X5 & X6 \\ X7 & X8 & X9 \end{bmatrix} \begin{bmatrix} Y1 & Y2 & Y3 \\ Y4 & Y5 & Y6 \\ Y7 & Y8 & Y9 \end{bmatrix} = \begin{bmatrix} X1Y1+X2Y4+X3Y7 & X1Y2+X2Y5+X3Y8 & X1Y3+X2Y6+X3Y9 \\ X4Y1+X5Y4+X6Y7 & X4Y2+X5Y5+X6Y8 & X4Y3+X5Y6+X6Y9 \\ X7Y1+X8Y4+X9Y7 & X7Y2+X8Y5+X9Y8 & X7Y3+X8Y6+X9Y9 \end{bmatrix}$$

As shown in the above expression, the respective elements of the result matrix are obtained as follows:

$Z1=X1Y1+X2Y4+X3Y7$ $Z2=X1Y2+X2Y5+X3Y8$ $Z3=X1Y3+X2Y6+X3Y9$ $Z4=X4Y1+X5Y4+X6Y7$ $Z5=X4Y2+X5Y5+X6Y8$ $Z6=X4Y3+X5Y6+X6Y9$ $Z7=X7Y1+X8Y4+X9Y7$ $Z8=X7Y2+X8Y5+X9Y8$ $Z9=X7Y3+X8Y6+Y9Y9$

As shown in the above expressions, each element (Z1 through Z9) of the result matrix is the sum of three sub-elements (e.g., the element Z1 is the sum of sub-elements X1Y1, X2Y4, and X3Y7). Further, each sub-element is the product of one element from the X matrix and one element from the Y matrix. Taking this into account, in the present invention, the sub-elements of the elements Z1 through Z9 are sequentially calculated, and then the elements Z1 through Z9 are calculated by adding up the sub-elements.

Figure 1:
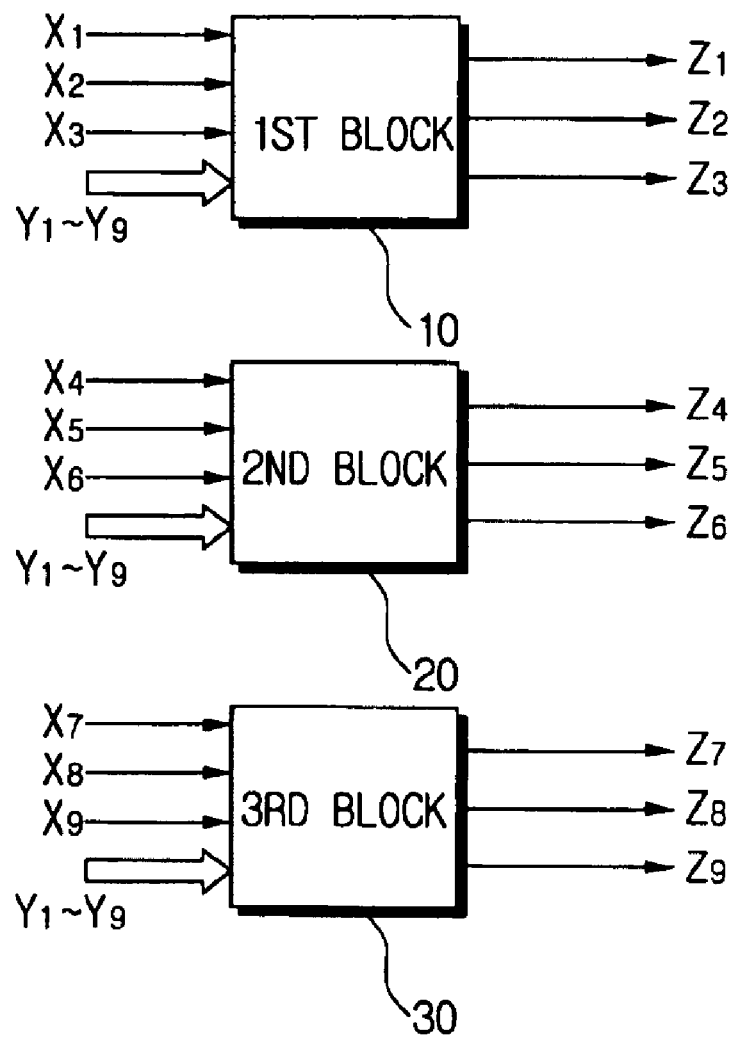
FIG. 1 is a block diagram of a conventional matrix calculator.
Figure 2:
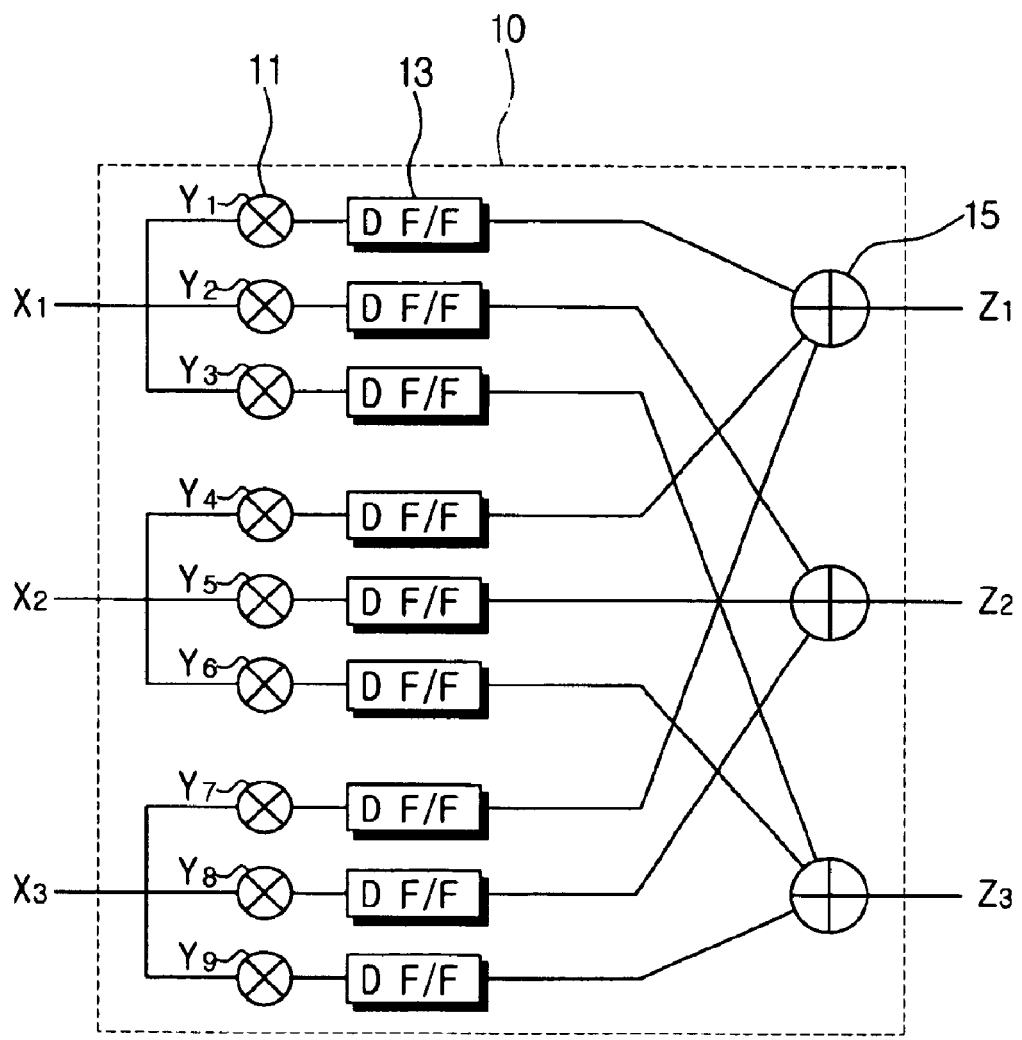
FIG. 2 is a block diagram showing a structure of a first block of FIG. 1 in greater detail.
Figure 3:
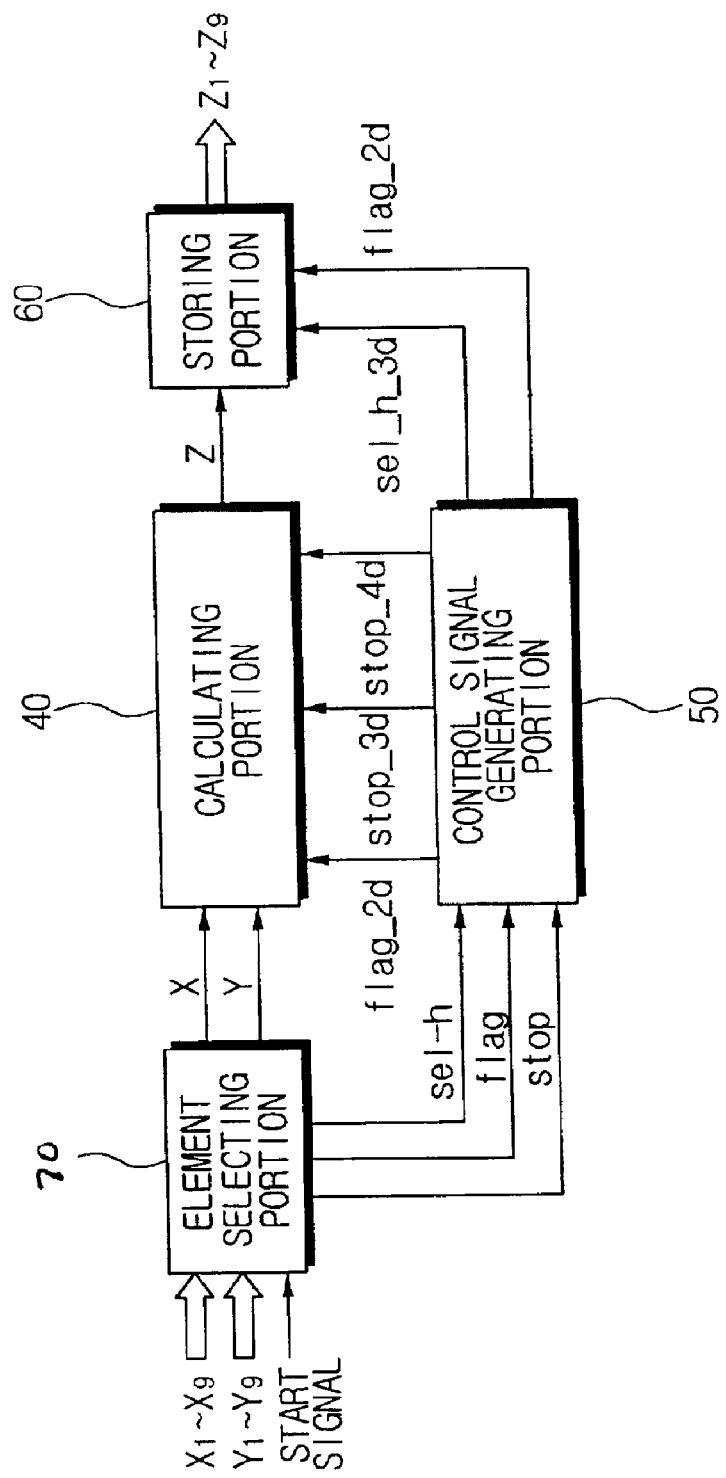
FIG. 3 is a block diagram showing a matrix calculator in accordance with the present invention.

FIG. 3 is a block diagram of a matrix calculator in accordance with the present invention. The matrix calculator in accordance with the present invention includes an element selecting portion 70 being simultaneously input with the elements X1 through X9, and Y1 through Y9 of the multiplicands, i.e., the X and Y matrices, and sequentially selecting and outputting necessary elements, a calculating portion 40 for performing a certain operation with respect to the elements selected by the element selecting portion 70, a storing portion 60 for storing the calculation result of the calculating portion 40 and finally outputting the elements of the result matrix, and a control signal generating portion 50 for generating a control signal that controls the calculating portion 40 and the storing portion 60.

Figure 4:
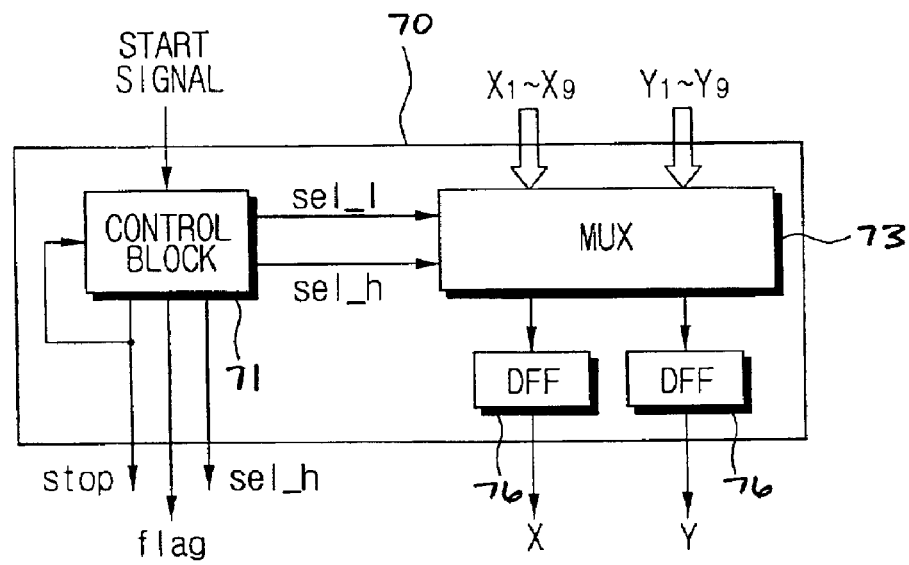
FIG. 4 is a block diagram showing an element selecting portion of FIG. 3 in greater detail.

FIG. 4 is a block diagram showing the construction of the element selecting portion 70 of FIG. 3 in greater detail. The element selecting portion 70 includes a multiplexer 73 for selecting and outputting two elements from the input elements, and a control block 71 for generating selection signals sel_l and sel_h that control the selection operation of the multiplexer 73.

The multiplexer 73 is simultaneously input with all the elements X1 through X9 and Y1 through Y9 of the first and second matrices (i.e., X and Y matrices). The multiplexer 73 is driven by the selection signals sel_l and sel_h generated by the control block 71, and according to the selection signals sel_l and sel_h, one element is selected from the elements X1 through X9 of the first matrix and one element is selected from the elements Y1 through Y9 of the second matrix. The selection signals sel_l and sel_h are changed at every pulse from a clock (not shown) that is either installed in the control block 71 or separately provided to control a sequential operation of the control block 71. Accordingly, the multiplexer 73 selects a different element at every clock pulse and outputs the selected element. Two outputs from the multiplexer 73 are input in the D flip-flops 76, respectively, and the D flip-flops 76 delay the output of the multiplexer 73 by one clock pulse and then output the same.

The two selection signals sel_h and sel_l for driving the multiplexer 73 consist of a high selection signal sel_h and a low selection signal sel_l. The high selection signal sel_h is a signal designating one of the elements of the matrix Z, which is the result matrix of the multiplication. The low selection signal sel_l is a signal for designating one of the sub-elements of the elements designated by the high selection signal sel_h. For example, if the high selection signal sel_h is 2 and the low selection signal sel_l is 3, the multiplexer 73 is driven to output the third sub-elements of Z2, i.e., X3Y8, and accordingly, the element selecting portion 70 selects and outputs X3 and Y8.

As a start signal to start the driving of the control block 71, for example, a starting signal generated by a vertical sync that is generated once every field of image signal can be used. When the starting signal is input to the control block 71, the high selection signal sel_h increases by one (1) at the first clock pulse (initial value of the high selection signal is zero), and simultaneously, the low selection signal sel_l increases by one (1) (initial value of the low selection signal is also zero). The value of the low selection signal sel_l increases by one every clock pulse, and accordingly, each sub-element of the first element Z1 is selected and output sequentially every clock pulse. The high selection signal sel_h increases by one (1) every third clock pulse. Accordingly, when the sequential output with respect to the three sub-elements X1Y1, X2Y4, X3Y7 of the first element Z1 is complete, the high selection signal sel_h increases to two (2) to indicate the second element Z2. As the above process repeats, the elements of the first and the second matrices, used in calculating the sub-elements of the elements of the matrix Z, are output sequentially.

Meanwhile, in addition to the selection signals sel_h and sel_l, the control block 71 generates control signals (flag, stop) to control the control signal generating portion 50. The 'flag' signal generates a 'high' pulse for one clock pulse at every end of the calculation of one element of the matrix Z, in order to indicate the completion of the calculation of one element. The 'stop' signal generates a 'high' pulse for one clock pulse at the end of calculation of nine (9) elements of matrix Z, in order to indicate the completion of the calculation of the matrix Z. Further, the 'stop' signal is feedback to the control block 71, to initialize the control block 71 by generating a 'high' pulse. The control signals (flag, stop) and the high selection signal sel_h are input to the control signal generating portion 50.

Figure 5:
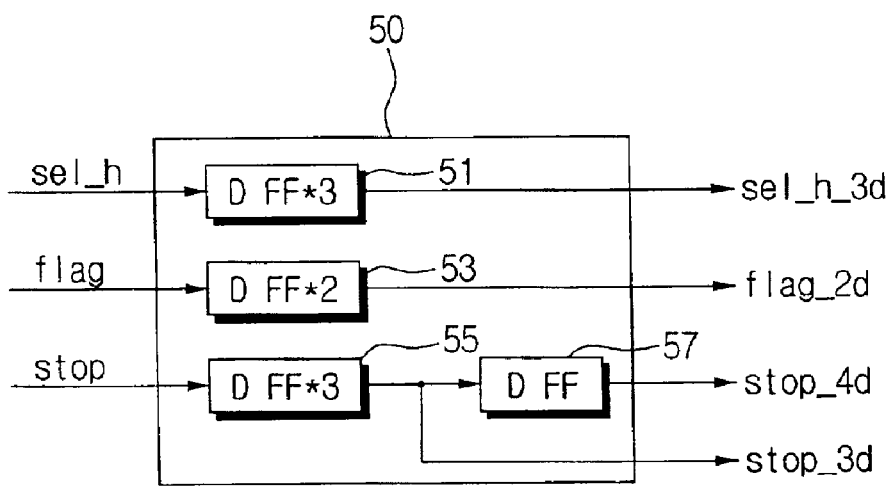
FIG. 5 is a block diagram showing a control signal generating portion of FIG. 3 in greater detail.

FIG. 5 is a block diagram showing the construction of the control signal generating portion 50 of FIG. 3 in greater detail. The control signal generating portion 50 includes a first delay portion 51 for delaying the high selection signal sel_h, a second delay portion 53 for delaying the 'flag' signal, and third and fourth delay portions 55 and 57 for delaying the 'stop' signal (reference character 'd' in FIGS. 3 through 6 indicates a delayed signal, and the number before the 'd' indicates the number of delayed clock pulses. For example, '_3d' indicate a signal delayed for three clock pulses).

The first delay portion 51 includes three D flip-flops and generates a signal sel_h_3d, which is the high selection signal sel_h delayed for three clock pulses. The second delay portion 53 includes two D flip-flops, and generates a signal flag_2d, which is the 'flag' signal delayed for two clock pulses. The third delay portion 55 includes three D flip-flops and generates a signal stop_3d, which is a 'stop' signal delayed for three clock pulses. The fourth delay portion 57 includes a D flip-flop connected in series with the third delay portion 55, and generates a signal stop_4d, which is an output signal stop_3d from the third delay portion 55 delayed for one more clock pulse.

Figure 6:
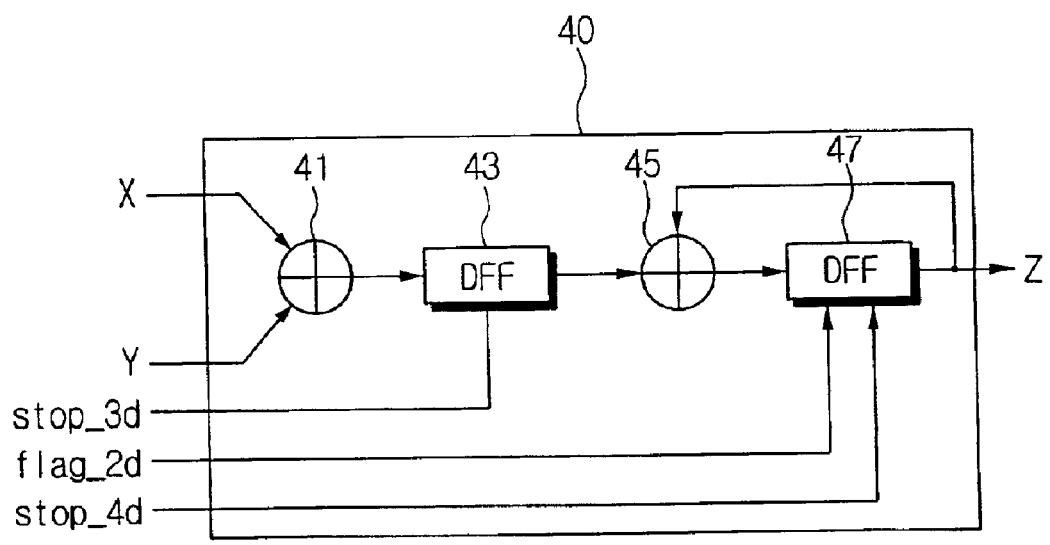
FIG. 6 is a block diagram showing a calculating portion of FIG. 3 in greater detail.

FIG. 6 is a block diagram showing the construction of the calculating portion 40 of FIG. 3 in greater detail. The calculating portion 40 includes a multiplier 41 input with two outputs from the multiplexer 73 of the element selecting portion 70, a first memory 43 for storing the output from the multiplier 41, a second memory 47 installed next to the first memory 43, and an adder 45 for adding the outputs from the first and the second memories 43 and 47 and inputs the resultant sum to the second memory 47. The first and the second memories 43 and 47 include a D flip-flop DFF, store the input value for one clock pulse and then output the same.

Among the output signals from the control signal generating portion 50, the signal stop_3d is input to the first memory 43, and when the signal stop_3d becomes a 'high' pulse, the first memory 43 is initialized (value stored in the D flip-flop is reset to zero). Further, among the signals output from the control signal generating portion 50, the signals flag_2d and stop_4d are input to the second memory 47, and when one of these two signals becomes a 'high' pulse, the second memory 47 is initialized (the value stored in the D flip-flop is reset to zero).

Figure 7:
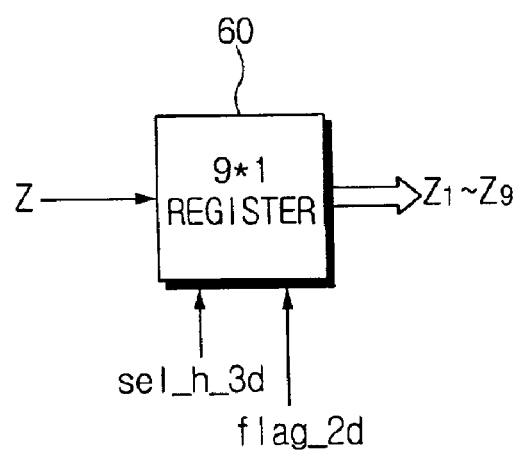
FIG. 7 is a block diagram showing a storing portion of FIG. 3 in greater detail.

FIG. 7 is a view showing the construction of the storing portion 60 of FIG. 3. The storing portion 60 includes a 9×1 register. Among the outputs from the control signal generating portion 50, the signals sel_h_3d and flag_2d are input to the storing portion 60, and the storing portion 60 is controlled by the signals sel_h_3d and flag_2d as input. Outputs Z from the calculating portion 40 are input to the storing portion 60, sequentially, and under the control of the signals sel_h_3d and flag_2d from the control signal generating portion 50, the storing portion 60 shifts nine elements Z1 through Z9 every third clock pulse, stores the result, and outputs the same in parallel after the storage has been completed.

The operation of the matrix calculator in accordance with the present invention will be described below.

The respective elements X1 through X9, Y1 through Y9 of the first and the second matrices (i.e., X and Y matrices) are simultaneously input to the multiplexer 73 of the element selecting portion 70. When the start signal is input to the control block 71, the control block 71 increases the value of the high and low selection signals sel_h and sel_l by one, which had been set to the initial value 'zero'. Accordingly, the elements necessary for calculating the first sub-element of the first element Z1 of the matrix Z are selected, and the multiplexer 73 outputs the selected elements X1 and Y1.

With every clock pulse, the low selection signal sel_l increases by one, and accordingly, the multiplexer 73 sequentially outputs the elements of the matrices X and Y, which constitute multiplicands of the sub-elements of the first element Z1. When the three sub-elements of the first element Z1 are output, the high selection signal sel_h increases by one, and the low selection signal sel_l increases again from the value 'one'. As a result, the elements of the matrices X and Y, which constitute multiplicands of the sub-elements of the second element Z2, are sequentially output in every clock pulse. As described above, the value of the low selection signal sel_l increases by one every clock pulse, and repeats the variation from one through three, while the value of the high selection signal sel_h increases by one every third clock pulse, and varies from one through nine. Accordingly, the elements necessary for calculation of matrix Z are sequentially output.

As described above, the 'flag' signal generates the 'high' pulse for one clock pulse every time the output of the sub-elements of one element of matrix Z is completed, while the 'stop' signal generates the 'high' pulse for one clock pulse every time the calculation of all the elements Z1 through Z9 of the matrix Z is completed.

The outputs from the multiplexer 73 are sequentially input to the multiplier 41 of the calculating portion 40, and the multiplier 41 multiplies the outputs from the multiplexer 73, and sequentially calculates the sub-elements X1Y1, . . . of the elements Z1 through Z9 of the matrix Z. The sub-elements output from the multiplier 41 are stored in the first memory 43. The values stored in the first memory 43 are then stored in the second memory 47 via the adder 45. Here, the initial value of the second memory 47 is set at zero. Since the second memory 47 is input with the sum of the output from the first memory 43 and the output from itself, the total sum of sub-elements sequentially calculated by the multiplier 41 is stored in the second memory 47.

Since the output from the multiplexer 73 is input to the second memory 47 via the D flip-flop 76 and the first memory 43, the second memory 47 is input with the sub-elements calculated by the multiplier 41, after two clock pulses of delay from the output of the elements of matrices X and Y. Since the 'flag' signal generates a 'high' signal only after the completion of the output of all the sub-elements (e.g. X1Y1, X2Y4, X3Y7) of one element of the Z matrix (e.g. Z1), the signal flag__2d, which is the 'flag' signal delayed by two clock pulses, is reset after one element that is the sum of three sub-elements is stored. Accordingly, every time the calculation of one element of matrix Z is completed, the value stored in the second memory 47 is reset to zero to be prepared for calculation of the next element, and at this time, the value stored in the second memory 47 is input to the storing portion 60 ahead of the reset of the second memory 47.

As the above process repeats nine times, values of all the elements Z1 through Z9 are calculated by the calculating portion 40, sequentially, and after completion of the calculation, the 'stop' signal becomes a 'high' pulse. Accordingly, the control block 71 is reset at the time of generation of the 'stop' signal, and after three and four clock pulses of delay, the first and the second memories 43 and 47 are reset to zero, respectively. Accordingly, initialization is carried out in order to perform multiplication on the next input of matrices.

The values of the elements Z1 through Z9 sequentially output from the calculating portion 40 are input to the storing portion 60 comprised of a 9×1 register. The storing portion 60 is input with a signal sel__h__3d, which is the high selection signal sel__h delayed by three clock pulses, and a signal flag__2d, which is the 'flag' signal delayed by two clock pulses.

The signal flag__2d shifts the values of each register in the storing portion 60. Accordingly, as the values of the second memory 47 of the calculating portion 40 are input to the front-most of the registers of the storing portion 60, the values of the registers in the storing portion 60 are shifted, simultaneously. And as this process repeats, values of respective elements stored in the second memory 47 are stored in the registers, sequentially.

The signal sel__h__3d outputs the values stored in the registers in the storing portion 60. At this time, the values of the registers of the storing portion 60 are output when the signal sel__h__3d becomes $1001_{(2)}$, i.e., 9. Accordingly, when the values of all of the sequentially-input elements Z1 through Z9 are stored in the registers, the values of Z1 through Z9 are output in parallel. As a result, the matrix Z, the multiplication result of matrices X and Y, is calculated. Here, the high selection signal sel__h is delayed by three clock pulses and the 'flag' signal is delayed by two clock pulses, in order to synchronize the shift time of the sequentially-input elements Z1 through Z9 with the output time of the elements Z1 through Z9.

Although FIGS. 3 through 7 exemplarily show the matrix calculator for performing multiplication of two 3×3 square matrices, it should be understood that the present invention can be applied to the calculation of other types of matrices. For example, the matrix calculator for multiplying 4×4 matrices can be achieved by setting the number of inputs to the multiplexer 73 of the element selecting portion 70 as eight (8), and adjusting the number of delay clock pulses of control signals suitable for the multiplication of 4×4 matrices. The matrix calculator for calculating non-square matrices can also be easily achieved with proper application and necessary adjustments to the number of delay clock pulses.

According to the present invention, multiplication of two matrices can be performed sequentially, by sequentially outputting and adding the sub-elements of the respective elements of the multiplicands. Accordingly, with the calculating portion comprised of one multiplier and one adder, and a control circuit that selects and controls the values to be input to the calculating portion, the matrix calculator of simple hardware and compact size can be constructed.

Although the preferred embodiment of the present invention has been described, it will be understood by those skilled in the art that the present invention should not be limited to the described preferred embodiment, but various changes and modifications can be made within the spirit and scope of the present invention as defined by the appended claims.

What is claimed is:

1. A matrix calculator for performing multiplication on a first matrix and a second matrix, comprising:
   an element selecting portion being inputted with elements of the first and the second matrices, the element selecting portion for selecting sequentially each element consisting sub-element of each element of result matrix achieved by the multiplication, among the inputted elements of the first and second matrices, and for outputting the selected element sequentially;
   a calculating portion for sequentially calculating each element of the result matrix by sequentially adding multiplied value of outputs from the element selecting portion;
   a storing portion for storing output from the calculating portion; and
   a control signal generating portion for generating a control signal that controls a timing of operation of the calculating portion and the storing portion,
   wherein the element selecting portion comprises:
      a multiplexer being inputted with the respective elements of the first and the second matrices in parallel; and
      a control block for generating a selection signal that selects an output from the multiplexer.

2. The matrix calculator of claim 1, wherein the calculating portion comprises:
   a multiplier for multiplying the output from the multiplexer;
   a first memory for temporarily storing output from the multiplier;
   a second memory; and
   an adder for adding a value stored in the first memory with a value stored in the second memory, and inputting the resultant value of adding into the second memory.

3. The matrix calculator of claim 2, wherein the control signal generating portion comprises a plurality of flip-flops for generating signals that delay signals output from the control block by a predetermined number of clocks, respectively, and then input the generated signals into the calculating portion and the storing portion.

4. The matrix calculator of claim 3, wherein the storing portion comprises a plurality of registers for sequentially storing the output from the calculating portion.

* * * * *